(12) United States Patent
Adams et al.

(10) Patent No.: US 8,692,848 B2
(45) Date of Patent: Apr. 8, 2014

(54) METHOD AND SYSTEM FOR TILE MODE RENDERER WITH COORDINATE SHADER

(75) Inventors: James Adams, Cambridge (GB); Gary Keall, Long Clawson (GB); Eben Upton, Cambridge (GB); Giles Edkins, Cambridge (GB)

(73) Assignee: Broadcom Corporation, Irvine, CA (US)

(*) Notice: Subject to any disclaimer, the term of this patent is extended or adjusted under 35 U.S.C. 154(b) by 332 days.

(21) Appl. No.: 12/868,508

(22) Filed: Aug. 25, 2010

(65) Prior Publication Data

US 2011/0148901 A1 Jun. 23, 2011

Related U.S. Application Data

(60) Provisional application No. 61/315,637, filed on Mar. 19, 2010.

(51) Int. Cl.
*G09G 5/00* (2006.01)

(52) U.S. Cl.
USPC ............ 345/620; 345/426; 345/502; 345/522

(58) Field of Classification Search
None
See application file for complete search history.

(56) References Cited

U.S. PATENT DOCUMENTS

| 5,428,716 | A  | * | 6/1995 | Brokenshire et al. | 345/421 |
|---|---|---|---|---|---|
| 7,167,171 | B2 | * | 1/2007 | Heim et al. | 345/418 |
| 7,505,036 | B1 | * | 3/2009 | Baldwin | 345/421 |
| 8,144,156 | B1 | * | 3/2012 | Baldwin | 345/501 |
| 8,154,554 | B1 | * | 4/2012 | Brown et al. | 345/522 |
| 2007/0279421 | A1 | * | 12/2007 | Gruber et al. | 345/502 |
| 2008/0150950 | A1 | * | 6/2008 | Sorgard et al. | 345/522 |
| 2010/0020069 | A1 | * | 1/2010 | Elmieh et al. | 345/419 |
| 2010/0164949 | A1 | * | 7/2010 | Min et al. | 345/419 |
| 2011/0292032 | A1 | * | 12/2011 | Yang | 345/419 |
| 2011/0304608 | A1 | * | 12/2011 | Yang | 345/419 |

OTHER PUBLICATIONS

OpenGL Programming Guide, Chapter 3, Feb., 19, 2005, http://www.glprogramming.com/red/chapter03.html.*
Rost, Randi, OpenGL Shading Language, Second Edition, Jan. 25, 2006, Addison-Wesley Professional, Chapter 6, pp. 99-104.*

* cited by examiner

*Primary Examiner* — Hau Nguyen
*Assistant Examiner* — Ryan M Gray
(74) *Attorney, Agent, or Firm* — Brinks Gilson & Lione

(57) ABSTRACT

A method and system are provided in which one or more processors and/or circuits are operable to generate position information for a plurality of primitives utilizing a coordinate shader, one or more lists based on the generated position information, and rendering information for the plurality of primitives utilizing a vertex shader and the generated one or more lists. The generated one or more lists may comprise indices associated with one or more primitives from the plurality of primitives and with one or more tiles from a plurality of tiles in a screen plane. The position information and the one or more lists may be generated during a first rendering phase, and the rendering information may be generated during a second rendering phase different from the first rendering phase. The coordinate shader may perform a subset of the operations supported by the vertex shader.

26 Claims, 10 Drawing Sheets

| TABLE OF VERTICES | | |
|---|---|---|
| 9 | $a_2$ | ... |
| 12 | $a_0$ | ... |
| 20 | $a_1$ | ... |
| 27 | $c_1$ | ... |
| 30 | $c_0$ | ... |
| 41 | $c_2$ | ... |

522 → row 1, 524 → row 2, 526 → row 3, 528 → row 4, 530 → row 5, 532 → row 6. 520

FIG. 5B

| LIST | | |
|---|---|---|
| Tile (1,0) | A | (12, 20, 9) |
| Tile (1,2) | A C | (12, 20, 9) (30, 27, 41) |

552 → row 1, 554 → row 2. 550

FIG. 5C

METHOD AND SYSTEM FOR TILE MODE RENDERER WITH COORDINATE SHADER

This application makes reference to, claims priority to, and claims the benefit of U.S. Provisional Patent Application Ser. No. 61/315,637, filed on Mar. 19, 2010.

CROSS-REFERENCE TO RELATED APPLICATIONS/INCORPORATION BY REFERENCE

This application also makes reference to:
U.S. Patent Application Ser. No. 61/318,653 which was filed on Mar. 29, 2010;
U.S. Patent Application Ser. No. 61/287,269 which was filed on Dec. 17, 2009;
U.S. Patent Application Ser. No. 61/311,640 which was filed on Mar. 8, 2010;
U.S. Patent Application Ser. No. 61/315,599 which was filed on Mar. 19, 2010;
U.S. Patent Application Ser. No. 61/328,541 which was filed on Apr. 27, 2010;
U.S. Patent Application Ser. No. 61/312,988 which was filed on Mar. 11, 2010;
U.S. Patent Application Ser. No. 61/321,244 which was filed on Apr. 6, 2010;
U.S. Patent Application Ser. No. 61/315,620 which was filed on Mar. 19, 2010; and
U.S. Patent Application Ser. No. 61/326,849 which was filed on Apr. 22, 2010.
Each of the above stated applications is hereby incorporated herein by reference in its entirety.

FIELD OF THE INVENTION

Certain embodiments of the invention relate to communication systems. More specifically, certain embodiments of the invention relate to a tile mode renderer with a coordinate shader.

BACKGROUND OF THE INVENTION

Image and video capabilities may be incorporated into a wide range of devices such as, for example, cellular phones, personal digital assistants, digital televisions, digital direct broadcast systems, digital recording devices, gaming consoles and the like. Operating on video data, however, may be very computationally intensive because of the large amounts of data that need to be constantly moved around. This normally requires systems with powerful processors, hardware accelerators, and/or substantial memory, particularly when video encoding is required. Such systems may typically use large amounts of power, which may make them less than suitable for certain applications, such as mobile applications.

Due to the ever growing demand for image and video capabilities, there is a need for power-efficient, high-performance multimedia processors that may be used in a wide range of applications, including mobile applications. Such multimedia processors may support multiple operations including audio processing, image sensor processing, video recording, media playback, graphics, three-dimensional (3D) gaming, and/or other similar operations.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for tile mode renderer with a coordinate shader, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 5B is a diagram that illustrates an exemplary table of vertex indices utilized during a binning phase in a tile mode renderer and/or a rendering phase in a tile mode renderer, in accordance with an embodiment of the invention.

FIG. 5C is a diagram that illustrates exemplary lists generated during a binning phase in a tile mode renderer, in accordance with an embodiment of the invention.

DETAILED DESCRIPTION OF THE INVENTION

Certain embodiments of the invention can be found in a method and system for a tile mode renderer with a coordinate shader. In accordance with various embodiments of the invention, one or more processors and/or circuits in a video processor may be utilized to generate position information for a plurality of primitives using a coordinate shader. The one or more processors and/or circuits may also be utilized to generate one or more lists based on the generated position information, and to generate rendering information for the plurality of primitives utilizing a vertex shader and the generated one or more lists. The one or more lists may comprise indices associated with one or more primitives from the plurality of primitives and with one or more tiles from a plurality of tiles in a screen plane. The position information and the one or more lists may be generated during a first rendering phase, and the rendering information may be generated during a second rendering phase that is different from the first rendering phase. The position information may be deleted or discarded after the generated one or more lists are completed. The coordinate shader may be operable to transform modeling coordinates from a model space to a viewing space. The coordinate shader may be operable to project the transformed modeling coordinates onto the screen plane. The vertex shader may be operable to transform modeling coordinates from a model space to a viewing space, to project the transformed modeling coordinates onto the screen plane, and to determine one or both of lightning information and texture information from the transformed modeling coordinates. The coordinate shader may be operable to perform a subset of the operations supported by the vertex shader.

Moreover, the one or more processors and/or circuits may be utilized to clip a primitive from the plurality of primitives that lies outside the screen plane to produce one or more clipped primitives that lie within the screen plane. This may associate each of the one or more clipped primitives with one or more tiles from the plurality of tiles in the screen plane. This may also enable one or more pointers to be added to the one or more lists. Each of the one or more pointers may indicate a record corresponding to one of the associated clipped primitives. The record may comprise barycentric coordinates of the associated clipped primitive.

Figure 1A:
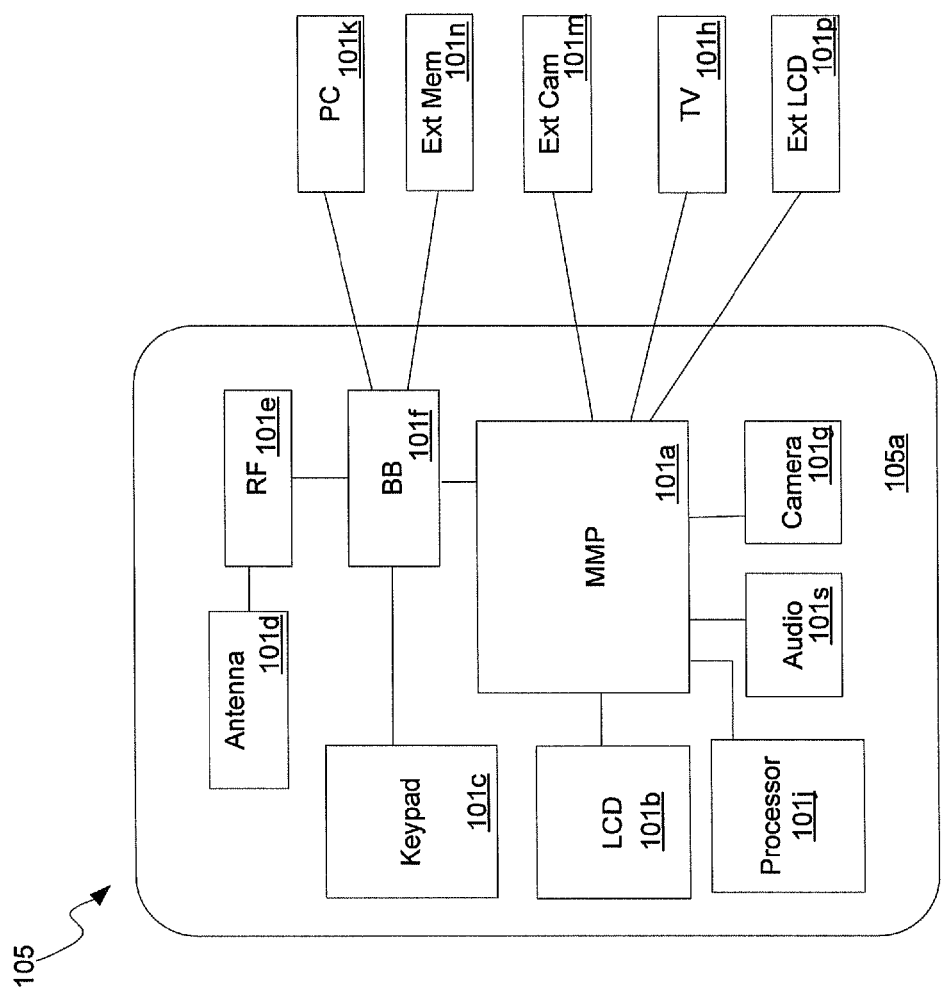
FIG. 1A is a block diagram of an exemplary multimedia system that is operable to provide a tile mode renderer that utilizes a coordinate shader, in accordance with an embodiment of the invention.

FIG. 1A is a block diagram of an exemplary multimedia system that is operable to provide a tile mode renderer that utilizes a coordinate shader, in accordance with an embodiment of the invention. Referring to FIG. 1A, there is shown a mobile multimedia system 105 that comprises a mobile multimedia device 105a, a television (TV) 101h, a personal computer (PC) 101k, an external camera 101m, external memory 101n, and external liquid crystal display (LCD) 101p. The mobile multimedia device 105a may be a cellular telephone or other handheld communication device. The mobile multimedia device 105a may comprise a mobile multimedia processor (MMP) 101a, an antenna 101d, an audio block 101s, a radio frequency (RF) block 101e, a baseband processing block 101f, an LCD 101b, a keypad 101c, and a camera 101g.

The MMP 101a may comprise suitable circuitry, logic, interfaces, and/or code that may be operable to perform video and/or multimedia processing for the mobile multimedia device 105a. The MMP 101a may also comprise integrated interfaces, which may be utilized to support one or more external devices coupled to the mobile multimedia device 105a. For example, the MMP 101a may support connections to a TV 101h, an external camera 101m, and an external LCD 101p.

The processor 101j may comprise suitable circuitry, logic, interfaces, and/or code that may be operable to control processes in the mobile multimedia system 105. Although not shown in FIG. 1A, the processor 101j may be coupled to a plurality of devices in and/or coupled to the mobile multimedia system 105.

In operation, the mobile multimedia device may receive signals via the antenna 101d. Received signals may be processed by the RF block 101e and the RF signals may be converted to baseband by the baseband processing block 101f. Baseband signals may then be processed by the MMP 101a. Audio and/or video data may be received from the external camera 101m, and image data may be received via the integrated camera 101g. During processing, the MMP 101a may utilize the external memory 101n for storing of processed data. Processed audio data may be communicated to the audio block 101s and processed video data may be communicated to the LCD 101b and/or the external LCD 101p, for example. The keypad 101c may be utilized for communicating processing commands and/or other data, which may be required for audio or video data processing by the MMP 101a.

In an embodiment of the invention, the MMP 101A may be operable to perform three-dimensional (3D) pipeline processing of video signals. More particularly, the MMP 101A may be operable to perform tile mode rendering in two separate phases, a first phase comprising a binning process or operation and a second phase comprising a rendering process or operation. The MMP 101a may process video signals within a plurality of video modules, as described further with respect to FIG. 1B.

Figure 1B:
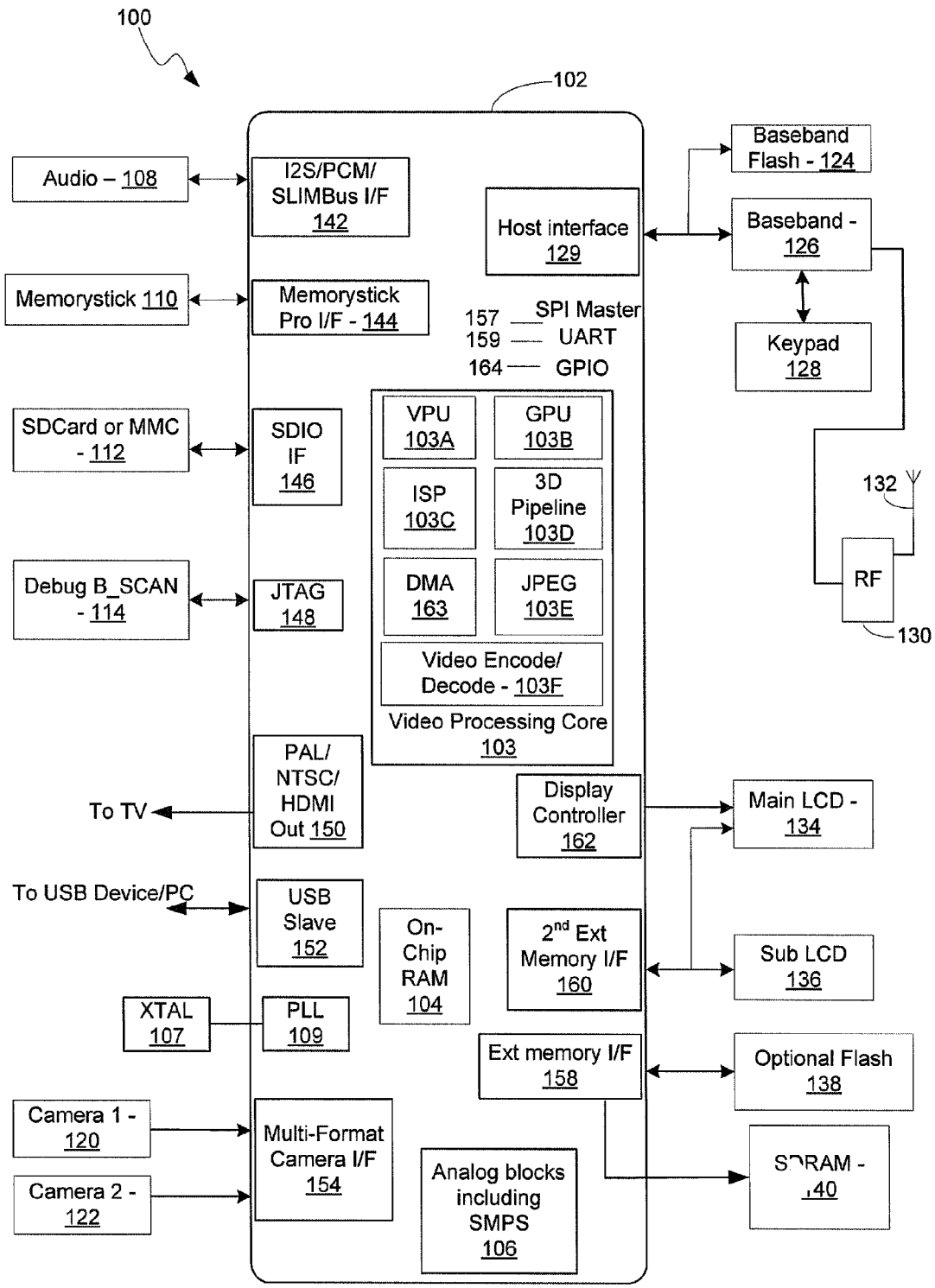
FIG. 1B is a block diagram of an exemplary multimedia processor that is operable to provide a tile mode renderer that utilizes a coordinate shader, in accordance with an embodiment of the invention.

FIG. 1B is a block diagram of an exemplary multimedia processor that is operable to provide a tile mode renderer that utilizes a coordinate shader, in accordance with an embodiment of the invention. Referring to FIG. 1B, the mobile multimedia processor 102 may comprise suitable logic, circuitry, interfaces, and/or code that may be operable to perform video and/or multimedia processing for handheld multimedia products. For example, the mobile multimedia processor 102 may be designed and optimized for video record/playback, mobile TV and 3D mobile gaming, utilizing integrated peripherals and a video processing core. The mobile multimedia processor 102 may comprise a video processing core 103 that may comprise a video processing unit (VPU) 103A, a graphic processing unit (GPU) 103B, an image sensor pipeline (ISP) 103C, a 3D pipeline 103D, a direct memory access (DMA) controller 163, a Joint Photographic Experts Group (JPEG) encoding/decoding module 103E, and a video encoding/decoding module 103F. The mobile multimedia processor 102 may also comprise on-chip RAM 104, an analog block 106, a phase-locked loop (PLL) 109, an audio interface (I/F) 142, a memory stick I/F 144, a Secure Digital input/output (SDIO) I/F 146, a Joint Test Action Group (JTAG) I/F 148, a TV output I/F 150, a Universal Serial Bus (USB) I/F 152, a camera I/F 154, and a host I/F 129. The mobile multimedia processor 102 may further comprise a serial peripheral interface (SPI) 157, a universal asynchronous receiver/transmitter (UART) I/F 159, a general purpose input/output (GPIO) pins 164, a display controller 162, an external memory I/F 158, and a second external memory I/F 160.

The video processing core 103 may comprise suitable logic, circuitry, interfaces, and/or code that may be operable to perform video processing of data. The on-chip Random Access Memory (RAM) 104 and the Synchronous Dynamic RAM (SDRAM) 140 comprise suitable logic, circuitry and/or code that may be adapted to store data such as image or video data.

The image sensor pipeline (ISP) 103C may comprise suitable circuitry, logic and/or code that may be operable to process image data. The ISP 103C may perform a plurality of processing techniques comprising filtering, demosaic, lens shading correction, defective pixel correction, white balance, image compensation, Bayer interpolation, color transformation, and post filtering, for example. The processing of image data may be performed on variable sized tiles, reducing the memory requirements of the ISP 103C processes.

The GPU 103B may comprise suitable logic, circuitry, interfaces, and/or code that may be operable to offload graphics rendering from a general processor, such as the processor 101j, described with respect to FIG. 1A. The GPU 103B may be operable to perform mathematical operations specific to graphics processing, such as texture mapping and rendering polygons, for example.

The 3D pipeline 103D may comprise suitable circuitry, logic and/or code that may enable the rendering of 2D and 3D graphics. The 3D pipeline 103D may perform a plurality of processing techniques comprising vertex processing, rasterizing, early-Z culling, interpolation, texture lookups, pixel shading, depth test, stencil operations and color blend, for example. The 3D pipeline 103D may be operable perform tile mode rendering in two separate phases, a first phase comprising a binning process or operation, and a second phase comprising a rendering process or operation The JPEG module 103E may comprise suitable logic, circuitry, interfaces, and/or code that may be operable to encode and/or decode JPEG images. JPEG processing may enable compressed storage of images without significant reduction in quality.

The video encoding/decoding module 103F may comprise suitable logic, circuitry, interfaces, and/or code that may be operable to encode and/or decode images, such as generating full 108p HD video from H.264 compressed data, for example. In addition, the video encoding/decoding module 103F may be operable to generate standard definition (SD) output signals, such as phase alternating line (PAL) and/or national television system committee (NTSC) formats.

Also shown in FIG. 1B are an audio block 108 that may be coupled to the audio interface I/F 142, a memory stick 110 that may be coupled to the memory stick I/F 144, an SD card block 112 that may be coupled to the SDIO IF 146, and a debug block 114 that may be coupled to the JTAG I/F 148. The PAL/NTSC/high definition multimedia interface (HDMI) TV output I/F 150 may be utilized for communication with a TV, and the USB 1.1, or other variant thereof, slave port I/F 152 may be utilized for communications with a PC, for example. A crystal oscillator (XTAL) 107 may be coupled to the PLL 109. Moreover, cameras 120 and/or 122 may be coupled to the camera I/F 154.

Moreover, FIG. 1B shows a baseband processing block 126 that may be coupled to the host interface 129, a radio frequency (RF) processing block 130 coupled to the baseband processing block 126 and an antenna 132, a basedband flash 124 that may be coupled to the host interface 129, and a keypad 128 coupled to the baseband processing block 126. A main LCD 134 may be coupled to the mobile multimedia processor 102 via the display controller 162 and/or via the second external memory interface 160, for example, and a subsidiary LCD 136 may also be coupled to the mobile multimedia processor 102 via the second external memory interface 160, for example. Moreover, an optional flash memory 138 and/or an SDRAM 140 may be coupled to the external memory I/F 158.

In operation, the mobile multimedia processor 102 may be adapted to perform tile mode rendering in two separate phases. A first phase may comprise a binning process or operation and a second phase may comprise a rendering process or operation. During the first or binning phase, it may be determined which pixel tiles in a screen plane are covered or overlapped by each graphic primitive associated with a video frame, for example. During this phase, an ordered list of primitives and/or state-change data for each tile may be built.

A coordinate shader may be utilized to perform at least some of the operations associated with the binning phase. The list or lists generated during the binning phase may comprise indices (e.g., vertex indices) that make reference to a table that comprises attributes of the vertices of the primitives. In some embodiments of the invention, the indices in the list or lists may be compressed. During the second or rendering phase, the contents associated with each pixel tile may be drawn or rendered. The rendering phase may utilize the list or lists generated during the binning phase that provide a reference to the vertex attributes of the primitives located within the tile. The vertex attributes may be brought into local memory on a tile-by-tile basis, for example. A vertex shader may be utilized to perform at least some of the operations of the rendering phase. Once a pixel tile is rendered, the rendered pixels may be pushed to main memory, for example, and a similar approach may be followed with other pixel tiles.

Figure 2:
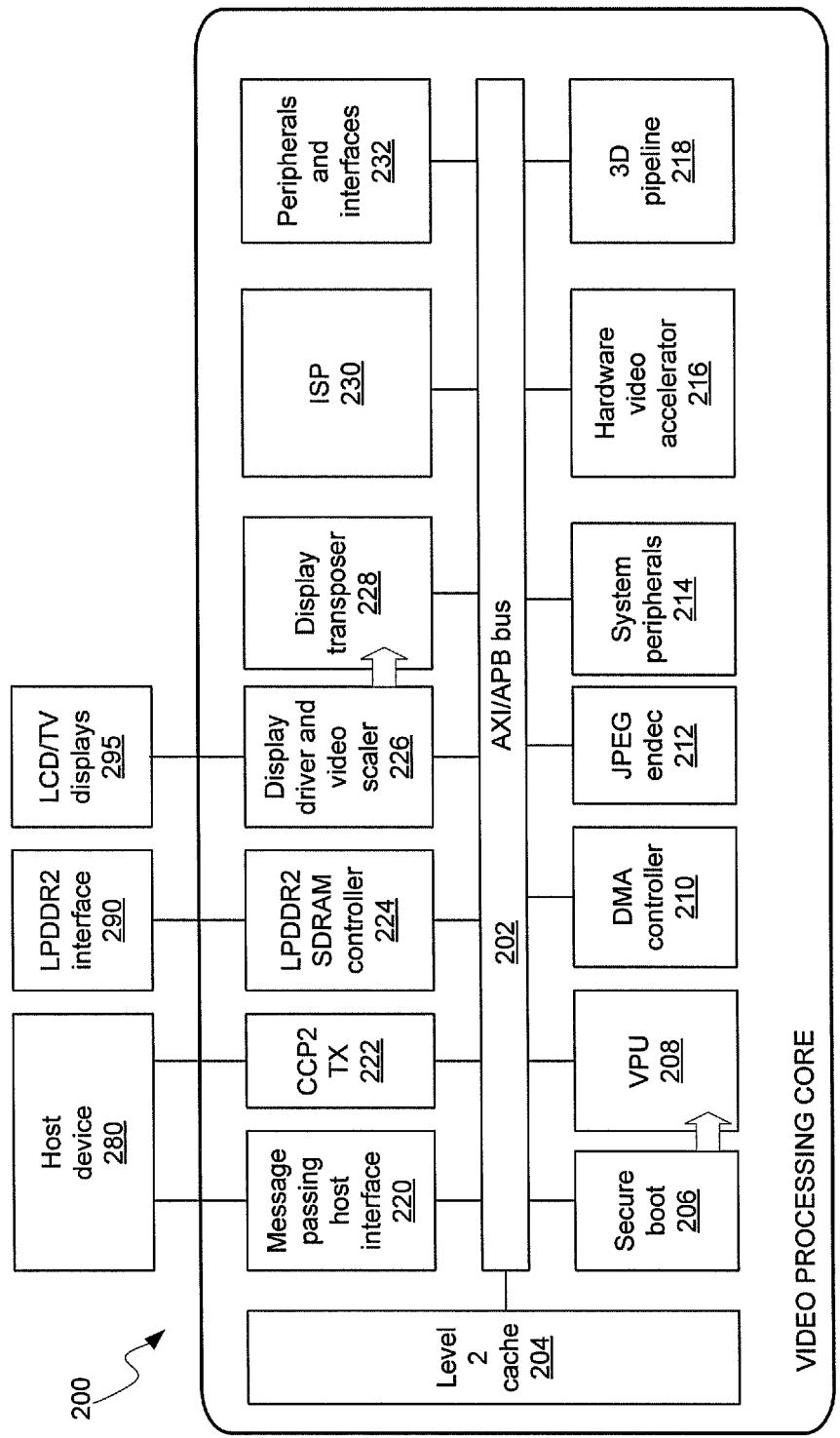
FIG. 2 is a block diagram that illustrates an exemplary video processing core architecture that is operable to provide a tile mode renderer that utilizes a coordinate shader, in accordance with an embodiment of the invention.

FIG. 2 is a block diagram that illustrates an exemplary video processing core architecture that is operable to provide a tile mode renderer that utilizes a coordinate shader, in accordance with an embodiment of the invention. Referring to FIG. 2, there is shown a video processing core 200 comprising suitable logic, circuitry, interfaces and/or code that may be operable for high performance video and multimedia processing. The architecture of the video processing core 200 may provide a flexible, low power, and high performance multimedia solution for a wide range of applications, including mobile applications, for example. By using dedicated hardware pipelines in the architecture of the video processing core 200, such low power consumption and high performance goals may be achieved. The video processing core 200 may correspond to, for example, the video processing core 103 described above with respect to FIG. 1B.

The video processing core 200 may support multiple capabilities, including image sensor processing, high rate (e.g., 30 frames-per-second) high definition (e.g., 1080p) video encoding and decoding, 3D graphics, high speed JPEG encode and decode, audio codecs, image scaling, and/or LCD an TV outputs, for example.

In one embodiment, the video processing core 200 may comprise an Advanced eXtensible Interface/Advanced Peripheral (AXI/APB) bus 202, a level 2 cache 204, a secure boot 206, a Vector Processing Unit (VPU) 208, a DMA controller 210, a JPEG encoder/decoder (endec) 212, a systems peripherals 214, a message passing host interface 220, a Compact Camera Port 2 (CCP2) transmitter (TX) 222, a Low-Power Double-Data-Rate 2 SDRAM (LPDDR2 SDRAM) controller 224, a display driver and video scaler 226, and a display transposer 228. The video processing core 200 may also comprise an ISP 230, a hardware video accelerator 216, a 3D pipeline 218, and peripherals and interfaces 232. In other embodiments of the video processing core 200, however, fewer or more components than those described above may be included.

In one embodiment, the VPU 208, the ISP 230, the 3D pipeline 218, the JPEG endec 212, the DMA controller 210, and/or the hardware video accelerator 216, may correspond to the VPU 103A, the ISP 103C, the 3D pipeline 103D, the JPEG 103E, the DMA 163, and/or the video encode/decode 103F, respectively, described above with respect to FIG. 1B.

Operably coupled to the video processing core 200 may be a host device 280, an LPDDR2 interface 290, and/or LCD/TV displays 295. The host device 280 may comprise a processor, such as a microprocessor or Central Processing Unit (CPU), microcontroller, Digital Signal Processor (DSP), or other like processor, for example. In some embodiments, the host device 280 may correspond to the processor 101j described above with respect to FIG. 1A. The LPDDR2 interface 290 may comprise suitable logic, circuitry, and/or code that may be operable to allow communication between the LPDDR2 SDRAM controller 224 and memory. The LCD/TV displays 295 may comprise one or more displays (e.g., panels, monitors, screens, cathode-ray tubes (CRTs)) for displaying image and/or video information. In some embodiments, the LCD/TV displays 295 may correspond to one or more of the TV 101*h* and the external LCD 101*p* described above with respect to FIG. 1A, and the main LCD 134 and the sub LCD 136 described above with respect to FIG. 1B.

The message passing host interface 220 and the CCP2 TX 222 may comprise suitable logic, circuitry, and/or code that may be operable to allow data and/or instructions to be communicated between the host device 280 and one or more components in the video processing core 200. The data communicated may include image and/or video data, for example.

The LPDDR2 SDRAM controller 224 and the DMA controller 210 may comprise suitable logic, circuitry, and/or code that may be operable to control the access of memory by one or more components and/or processing blocks in the video processing core 200.

The VPU 208 may comprise suitable logic, circuitry, and/or code that may be operable for data processing while maintaining high throughput and low power consumption. The VPU 208 may allow flexibility in the video processing core 200 such that software routines, for example, may be inserted into the processing pipeline. The VPU 208 may comprise dual scalar cores and a vector core, for example. The dual scalar cores may use a Reduced Instruction Set Computer (RISC)-style scalar instruction set and the vector core may use a vector instruction set, for example. Scalar and vector instructions may be executed in parallel.

Although not shown in FIG. 2, the VPU 208 may comprise one or more Arithmetic Logic Units (ALUs), a scalar data bus, a scalar register file, one or more Pixel-Processing Units (PPUs) for vector operations, a vector data bus, a vector register file, a Scalar Result Unit (SRU) that may operate on one or more PPU outputs to generate a value that may be provided to a scalar core. Moreover, the VPU 208 may comprise its own independent level 1 instruction and data cache.

The ISP 230 may comprise suitable logic, circuitry, and/or code that may be operable to provide hardware accelerated processing of data received from an image sensor (e.g., charge-coupled device (CCD) sensor, complimentary metal-oxide semiconductor (CMOS) sensor). The ISP 230 may comprise multiple sensor processing stages in hardware, including demosaicing, geometric distortion correction, color conversion, denoising, and/or sharpening, for example. The ISP 230 may comprise a programmable pipeline structure. Because of the close operation that may occur between the VPU 208 and the ISP 230, software algorithms may be inserted into the pipeline.

The hardware video accelerator 216 may comprise suitable logic, circuitry, and/or code that may be operable for hardware accelerated processing of video data in any one of multiple video formats such as H.264, Windows Media 8/9/10 (VC-1), MPEG-1, MPEG-2, and MPEG-4, for example. For H.264, for example, the hardware video accelerator 216 may encode at full HD 1080p at 30 frames-per-second (fps). For MPEG-4, for example, the hardware video acceleration 216 may encode a HD 720p at 30 fps. For H.264, VC-1, MPEG-1, MPEG-2, and MPEG-4, for example, the hardware video accelerator 216 may decode at full HD 1080p at 30 fps or better. The hardware video accelerator 216 may be operable to provide concurrent encoding and decoding for video conferencing and/or to provide concurrent decoding of two video streams for picture-in-picture applications, for example.

The 3D pipeline 218 may comprise suitable logic, circuitry, and/or code that may be operable to provide 3D rendering operations for use in, for example, graphics applications. The 3D pipeline 218 may support OpenGL-ES 2.0, OpenGL-ES 1.1, and OpenVG 1.1, for example. The 3D pipeline 218 may comprise a multi-core programmable pixel shader, for example. The 3D pipeline 218 may be operable to handle 32M triangles-per-second (16M rendered triangles-per-second), for example. The 3D pipeline 218 may be operable to handle 1G rendered pixels-per-second with Gouraud shading and one bi-linear filtered texture, for example. The 3D pipeline 218 may support four times (4×) full-screen anti-aliasing at full pixel rate, for example.

The 3D pipeline 218 may comprise a tile mode architecture in which a rendering operation may be separated into a first phase and a second phase. During the first phase, the 3D pipeline 218 may utilize a coordinate shader to perform a binning operation. The coordinate shader may be obtained from a vertex shader at compile time, for example. In one embodiment of the invention, the coordinate shader may be obtained automatically during vertex shader compilation. The coordinate shader may comprise those portions of the vertex shader that relate to the processing of the coordinates of the vertices. Such coordinates may be utilized to, for example, control the binning operation and need not be stored for subsequent use such as during the second phase, for example.

During the second phase, the 3D pipeline 218 may utilize a vertex shader to render images such as those in frames in a video sequence, for example. A vertex shader may be typically utilized to transform a 3D position of a vertex from a graphics primitive such as triangles or polygons, for example, in a virtual space to a corresponding two-dimensional (2D) coordinate at on a screen plane. A vertex shader may also be utilized to obtain a depth value for a Z-buffer for a vertex. A vertex shader may process various vertex properties such as color, position, and/or texture coordinates. The output of a vertex shader may be utilized by a geometry shader and/or a rasterizer, for example. Because the coordinate shader utilized in the first phase need not generate a complete set of vertex properties that can be produced by a typical full vertex shader, those values need not be stored for later use, which may result in reduced memory and/or bandwidth requirements.

The JPEG endec 212 may comprise suitable logic, circuitry, and/or code that may be operable to provide processing (e.g., encoding, decoding) of images. The encoding and decoding operations need not operate at the same rate. For example, the encoding may operate at 120M pixels-per-second and the decoding may operate at 50M pixels-per-second depending on the image compression.

The display driver and video scaler 226 may comprise suitable logic, circuitry, and/or code that may be operable to drive the TV and/or LCD displays in the TV/LCD displays 295. In this regard, the display driver and video scaler 226 may output to the TV and LCD displays concurrently and in real time, for example. Moreover, the display driver and video scaler 226 may comprise suitable logic, circuitry, and/or code that may be operable to scale, transform, and/or compose multiple images. The display driver and video scaler 226 may support displays of up to full HD 1080p at 60 fps.

The display transposer 228 may comprise suitable logic, circuitry, and/or code that may be operable for transposing output frames from the display driver and video scaler 226. The display transposer 228 may be operable to convert video to 3D texture format and/or to write back to memory to allow processed images to be stored and saved.

The secure boot 206 may comprise suitable logic, circuitry, and/or code that may be operable to provide security and Digital Rights Management (DRM) support. The secure boot 206 may comprise a boot Read Only Memory (ROM) that may be used to provide secure root of trust. The secure boot 206 may comprise a secure random or pseudo-random number generator and/or secure (One-Time Password) OTP key or other secure key storage.

The AXI/APB bus 202 may comprise suitable logic, circuitry, and/or interface that may be operable to provide data and/or signal transfer between various components of the video processing core 200. In the example shown in FIG. 2, the AXI/APB bus 202 may be operable to provide communication between two or more of the components the video processing core 200.

The AXI/APB bus 202 may comprise one or more buses. For example, the AXI/APB bus 202 may comprise one or more AXI-based buses and/or one or more APB-based buses. The AXI-based buses may be operable for cached and/or uncached transfer, and/or for fast peripheral transfer. The APB-based buses may be operable for slow peripheral transfer, for example. The transfer associated with the AXI/APB bus 202 may be of data and/or instructions, for example.

The AXI/APB bus 202 may provide a high performance system interconnection that allows the VPU 208 and other components of the video processing core 200 to communicate efficiently with each other and with external memory.

The level 2 cache 204 may comprise suitable logic, circuitry, and/or code that may be operable to provide caching operations in the video processing core 200. The level 2 cache 204 may be operable to support caching operations for one or more of the components of the video processing core 200. The level 2 cache 204 may complement level 1 cache and/or local memories in any one of the components of the video processing core 200. For example, when the VPU 208 comprises its own level 1 cache, the level 2 cache 204 may be used as complement. The level 2 cache 204 may comprise one or more blocks of memory. In one embodiment, the level 2 cache 204 may be a 128 kilobyte four-way set associate cache comprising four blocks of memory (e.g., Static RAM (SRAM)) of 32 kilobytes each.

The system peripherals 214 may comprise suitable logic, circuitry, and/or code that may be operable to support applications such as, for example, audio, image, and/or video applications. In one embodiment, the system peripherals 214 may be operable to generate a random or pseudo-random number, for example. The capabilities and/or operations provided by the peripherals and interfaces 232 may be device or application specific.

In operation, the video processing core 200 may be operable to carry out multiple multimedia tasks simultaneously without degrading individual function performance. In various exemplary embodiments of the invention, the 3D pipeline 218 may be operable to provide 3D rendering, such as tile-based rendering, for example, that may comprise a first or binning phase and a second or rendering phase. In this regard, the 3D pipeline 218 and/or other components of the video processing core 200 that are used to provide 3D rendering operations may be referred to as a tile-mode renderer.

The video processing core 200 may also be operable to implement movie playback operations. In this regard, the video processing core 200 may be operable to add 3D effects to video output, for example, to map the video onto 3D surfaces or to mix 3D animation with the video. In another exemplary embodiment of the invention, the video processing core 200 may be utilized in a gaming device. In this regard, full 3D functionality may be utilized. The VPU 208 may be operable to execute a game engine and may supply graphics primitives (e.g., polygons) to the 3D pipeline 218 to enable high quality self-hosted games. In another embodiment, the video processing core 200 may be utilized for stills capture. In this regard, the ISP 230 and/or the JPEG endec 212 may be utilized to capture and encode a still image. For stills viewing and/or editing, the JPEG endec 212 may be utilized to decode the stills data and the video scaler may be utilized for display formatting. Moreover, the 3D pipeline 218 may be utilized for 3D effects, for example, for warping an image or for page turning transitions in a slide show, for example.

Figure 3:
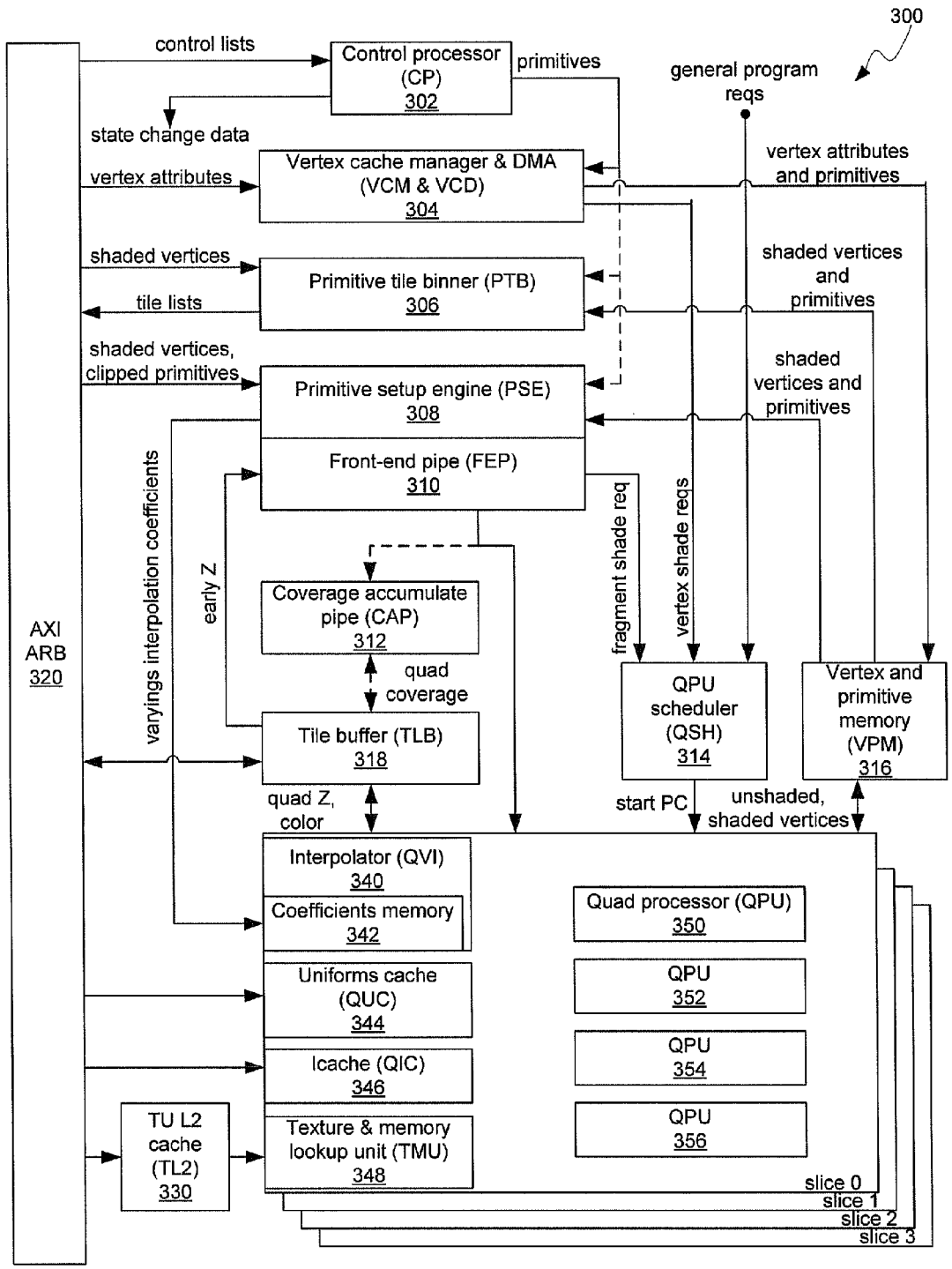
FIG. 3 is a block diagram that illustrates an exemplary 3D pipeline that is operable to provide a tile mode renderer that utilizes a coordinate shader, in accordance with an embodiment of the invention.

FIG. 3 is a block diagram that illustrates an exemplary 3D pipeline that is operable to provide a tile mode renderer that utilizes a coordinate shader, in accordance with an embodiment of the invention. Referring to FIG. 3, there is shown a 3D pipeline 300 that may comprise a control processor (CP) 302, a vertex cache manager and DMA (VCM and VCD) 304, a primitive tile binner (PTB) 306, a primitive setup engine (PSE) 308, a front-end pipe (FEP) 310, a coverage accumulate pipe (CAP) 312, a quad processor (QPU) scheduler 314, a vertex and primitive memory (VPM) 316, a tile buffer (TLB) 318, a bus arbiter (AIX ARB) 320, a cache 330, an interpolator (QVI) 340, a coefficients memory 342, a uniforms cache (QUC) 344, an instruction cache (QIC) 346, a texture and memory lookup unit (TMU) 348 and a plurality of QPUs 350, 352, 354, and 356. In the embodiment of the invention illustrated in FIG. 3, there may be a plurality of groups or slices in the 3D pipeline 300, where each slice may comprise plurality of QPUs. For example, the 3D pipeline 300 may comprise slices 0, 1, 2, and 3, each slice comprising four QPUs.

The 3D pipeline 300 may be similar and/or substantially the same as the 3D pipeline 218 described with respect to FIG. 2 and/or may be implemented within the mobile multimedia system 105 described above with respect to FIG. 1A, for example. The 3D pipeline 300 may comprise a scalable architecture and may comprise a plurality of floating-point shading processors such as, for example, the QPUs 350, 352, 354, and 356. In various embodiments of the invention, the 3D pipeline 300 may be operable to support OpenGL-ES and/or OpenVG applications. Moreover, the 3D pipeline 300 may be utilized in a wide variety of system-on-chip (SoC) devices. The 3D pipeline 300 may comprise suitable logic, circuitry, interfaces and/or code that may be operable to perform tile-based pixel rendering. Tile based pixel rendering may enable improvements in memory bandwidth and processing performance. In this regard, during graphics processing and/or storage, a frame may be divided into a plurality of areas referred to as pixel tiles or tiles. A pixel tile may correspond to, for example, a 32 pixels×32 pixels area in a screen plane. The 3D pipeline 300 may be operable to provide a first or binning phase and a second or rendering phase of graphics primitives processing utilizing a tile-by-tile approach. The various types of graphics primitives that may be utilized with the 3D pipeline 300 may be referred to generally as primitives.

The QPUs 350, 352, 354 and 356 may comprise suitable logic, circuitry, interfaces and/or code that may be operable to perform tile-based rendering operations. The rendering operations may comprise a binning phase in which a coordinate shader is utilized and a rendering phase in which a vertex shader is utilized. A QPU may comprise a special purpose floating-point shader processor. In one embodiment of the invention, a QPU may comprise a fixed-cycle pipeline structure, such as a 3-cycle-pipeline structure, for example. In various embodiments of the invention, each of QPUs 350, 352, 356 and/or 356 may comprise a 16-way single instruction multiple data (SIMD) processor that may be operable to process streams of pixels, however, the invention need not be limited in this regard. As described above, the QPUs may be organized into groups of 4, for example, that may be referred to as slices. The QPUs 350, 352, 356 and/or 356 may share various common resources. For example, the slices may share the QIC 346, one or two TMUs 348, the QUC 344, the coefficients memory 342 and/or the QVI 340. The QPUs 350, 352, 354 and 356 may be closely coupled to 3D hardware for fragment shading and utilize signaling instructions and dedicated internal registers. The QPUs 350, 352, 354 and 356 may also support a plurality of hardware threads with cooperative thread switching that may hide texture lookup latency during 3D fragment shading.

The QPUs 350, 352, 354 and/or 356 may be operable to perform various aspects of interpolating vertices in modified primitives, for example, in clipped primitives. The interpolated vertices may be referred to as varyings. In this regard, blend functions and/or various aspects of the varyings interpolation may be performed in software.

In some embodiments of the invention, the 3D pipeline may be simplified by decoupling memory access operations and certain instructions, such as reciprocal, reciprocal square root, logarithm, and exponential, for example, and placing them in asynchronous I/O peripherals operably coupled to a QPU core by, for example, FIFOs. Moreover, although the QPUs may be within and closely coupled to the 3D system, the QPUs may also be capable of providing a general-purpose computation resource to non-3D operations such as video codecs and/or the image sensor pipeline.

The VCM and VCD 304 may comprise suitable logic, circuitry, interfaces and/or code that may be operable to collect batches of vertex attributes and may place them into the VPM 316. Each batch of vertices may be shaded by one of the QPUs 350, 352, 356 and/or 356 and the results may be stored back into the VPM 316.

The PSE 308 may comprise suitable logic, circuitry, interfaces and/or code that may be operable to fetch shaded vertex data and primitives from the VPM 316. Moreover, the PSE 308 may be operable to calculate setup data for rasterizing primitives and coefficients of various equations for interpolating the varyings. In this regard, rasteriser setup parameters and Z and W interpolation coefficients may be fed to the FEP 310. The varyings interpolation coefficients may be stored directly to a memory within a slice for just-in-time interpolation.

The FEP 310 may comprise suitable logic, circuitry, interfaces and/or code that may be operable to perform rasteriser, Z interpolation, Early-Z test, W interpolation and W reciprocal functions. Groups of pixels output by the FEP 310 may be stored into registers mapped into QPUs which may be scheduled to carry out fragment shading for that group of pixels.

There may be a TMU 348 per slice, but texturing performance may be scaled by providing additional TMUs. Because of the use of multiple slices, the same texture may appear in more than one TMU 348. To avoid memory bandwidth and waste of cache memory with common textures, there may be a L2 texture cache (TL2), and each TMU 348 may comprise a small internal cache.

The TMUs 348 may comprise suitable logic, circuitry, interfaces and/or code that may be operable to perform general purpose data lookups from memory and/or for filtered texture lookups. Alternatively, the VCM and VCD 304 may be operable to perform direct memory access of data going into or out of the VPM 316 where it may be accessed by the QPUs. The QPUs may also read program constants, such as non-index shader uniforms, as a stream of data from main memory via the QUC 344.

The CAP 312 may comprise suitable logic, circuitry, interfaces and/or code that may be operable to perform OpenVG coverage rendering, for example. In this regard, the QPUs may be bypassed.

The QPUs and/or the CAP 312 may output pixel data to the TLB 318. In various embodiments of the invention, the TLB 318 may be configured to handle 64×64 samples and/or may support 32×32 pixel tiles. In other embodiments of the invention, TLB 318 may handle 64×64 pixel tiles in non-multi-sample and/or OpenVG 16× coverage modes. The TLB may also be configured to handle 64×32 samples with 64-bit floating-point color for HDR rendering. The TLB 318 may be operable to write decimated color data to a main memory frame buffer when rendering of a tile is complete. The TLB 318 may store and/or reload the tile data to and/or from memory using data compression.

In operation, the 3D pipeline 300 may be driven by control lists in memory, which may specify sequences of primitives and system state data. The control processor (CP) 302 may be operable to interpret the control lists and may feed the 3D pipeline 300 with primitive and state data. In various embodiments of the invention, a pixel rendering pass of all tiles may be performed without use of a driver.

The 3D pipeline 300 may perform tile-based pixel rendering in a plurality of phases, for example, a binning phase and a rendering phase. During the first or binning phase of the rendering operation, the vertex coordinate transform portion of the operation that is typically performed by a vertex shader may be performed by a coordinate shader. The PTB 306 may fetch the transformed vertex coordinates and primitives from the VPM 316 and may determine which pixel tiles, if any, the primitive overlaps. The PTB 306 may build a list in memory for each tile, for example, which may comprise the primitives that impact that tile and references to any state changes that may apply.

The 3D pipeline 300 may be operable to clip primitives, for example, triangles or polygons that may extend beyond a tile, viewport, or screen plane. Clipped primitives may be divided into a plurality of new triangles and vertices for the new triangles, which may be referred to as varyings, and may be interpolated. The PSE 308 may also store varying interpolation coefficients concurrently into memory for each QPU slice, for example. In various embodiments of the invention, dedicated hardware may be utilized to partially interpolate varyings and the remaining portion of the interpolation may be performed in software by, for example, one or more QPUs.

During the second or rendering phase of the rendering operation in which a vertex shader is utilized, the 3D pipeline 300 may utilize the tile lists created during the binning phase to perform tile-based shading of vertices and/or primitives. The 3D pipeline 300 may output rendered pixel information.

Figure 4:
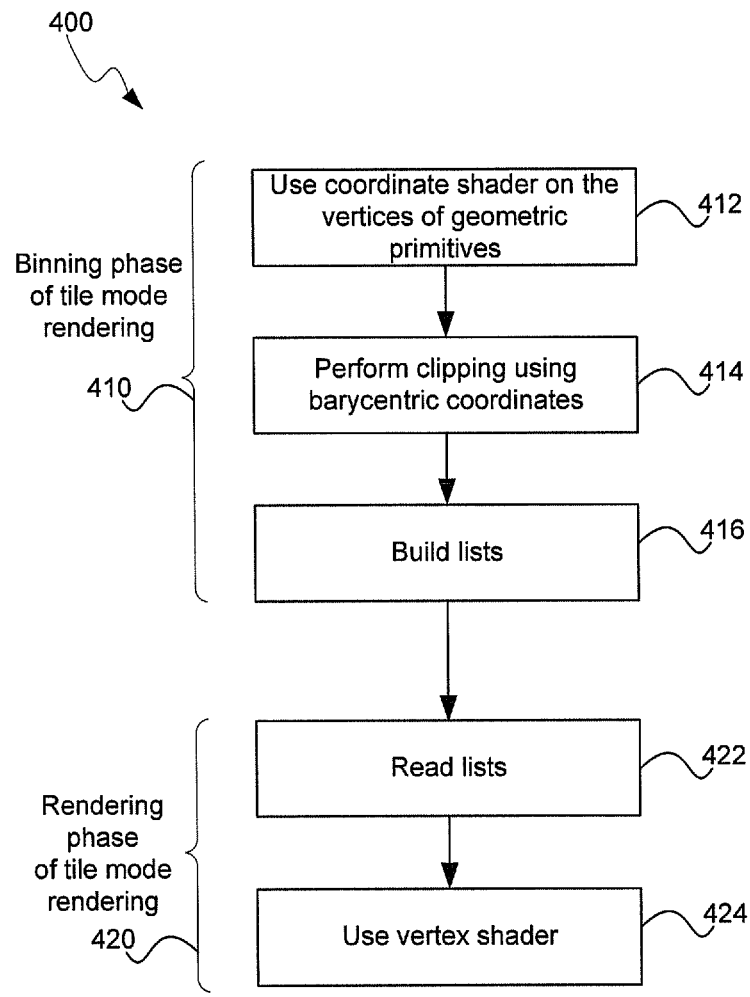
FIG. 4 is a flow chart that illustrates exemplary steps in a two-phase tile mode renderer, in accordance with an embodiment of the invention.

FIG. 4 is a flow chart that illustrates exemplary steps in a two-phase tile mode renderer, in accordance with an embodiment of the invention. Referring to FIG. 4, a flow chart 400 describes a tile mode rendering operation that comprises a first or binning phase 410 and a second or rendering phase 420. During the binning phase 410, at step 412, a graphics engine or processor, such as the 3D pipeline 218 and the 3D pipeline 300 described above with respect to FIGS. 2 and 3, respectively, may be utilized to perform coordinate shading on the vertices of geometric or graphic primitives. The coordinate shading may be performed by a coordinate shader that may be generated from a vertex shader at compile time. The coordinate shader may perform, for example, the vertex coordinate transform portion of the operations that are typically performed by a vertex shader.

A vertex shader or vertex shading operation may typically transform an object from a modeling coordinate space or local object space of geometric primitives, to a 3D world space, that is, a location in a 3D scene. The objects may be further transformed from the 3D world space to a 3D view or camera space that may be based on a position and orientation of a virtual camera such that the original 3D scene may be seen from the camera's perspective. Thus, a vertex shader or vertex shading operation may typically perform a first 3D transformation or modeling transformation and a second 3D transformation or camera transformation. Each transformation may comprise one or more of scaling, translation, and rotation operations. The transformations may be based on modeling coordinates and/or transformation matrices provided by the user's program, for example. A subsequent transformation or projection operation, in which the geometry is transformed from the camera space to a 2D image space, thus mapping the 3D scene onto a plane as seen from the virtual camera. The second 3D transformation or camera transformation and the projection may be performed as a single operation. In addition to the vertex coordinate transform operations, the vertex shader or vertex shading operation may also provide other operations such as calculations of vertex lighting and/or surface properties. Moreover, texturing may also be performed by the vertex shader.

In some embodiments of the invention, the coordinate shader may comprise one or more of the transformation from the modeling coordinate space to the 3D world space, the transformation from the 3D world space to the view space, and the projection from the view space onto the 2D image space or screen plane. The coordinate shader, however, need not perform the lighting and/or texture calculations provided by a typical vertex shader.

Returning to the flow chart 400, at step 414, clipping may be performed on those primitives that fall outside the viewing space or the area on the screen plane on which the pixels will be written. Clipping may refer to the process of truncating the polygons or triangles to fit within the viewing area. Further description of a clipping operation using barycentric coordinates is provided below with respect to FIGS. 6A-6C. The barycentric coordinates may be used in the rendering phase 420 described below to set up the varyings of the clipped vertices produced in step 414 from the varyings calculated by a vertex shader from the original vertices of the clipped primitives.

At step 416, the 3D pipeline may build a list for each pixel tile associated with the viewing area or screen plane that comprises each of the primitives that overlap that pixel tile. For the 3D pipeline 300 described above with respect to FIG. 3, for example, the PTB 306 may determine which pixel tiles, if any, the primitive overlaps. The PTB 306 may build a list in memory for each tile, for example, which may comprise the primitives that overlap that tile and references to any state changes that may apply. After the lists are built, the coordinate or positional information generated by the coordinate shader may be discarded or deleted.

During the rendering phase 420, at step 422, the list or lists generated during the binning phase 410 may be read. At step 424, the list or lists read at step 422 may be utilized to perform a full vertex shading operation on a tile-by-tile basis. In this regard, the vertex shader may again perform the coordinate transformation and/or projection operations performed by the coordinate shader at step 412 and may also perform lighting and/or texture calculations.

Figure 5A:
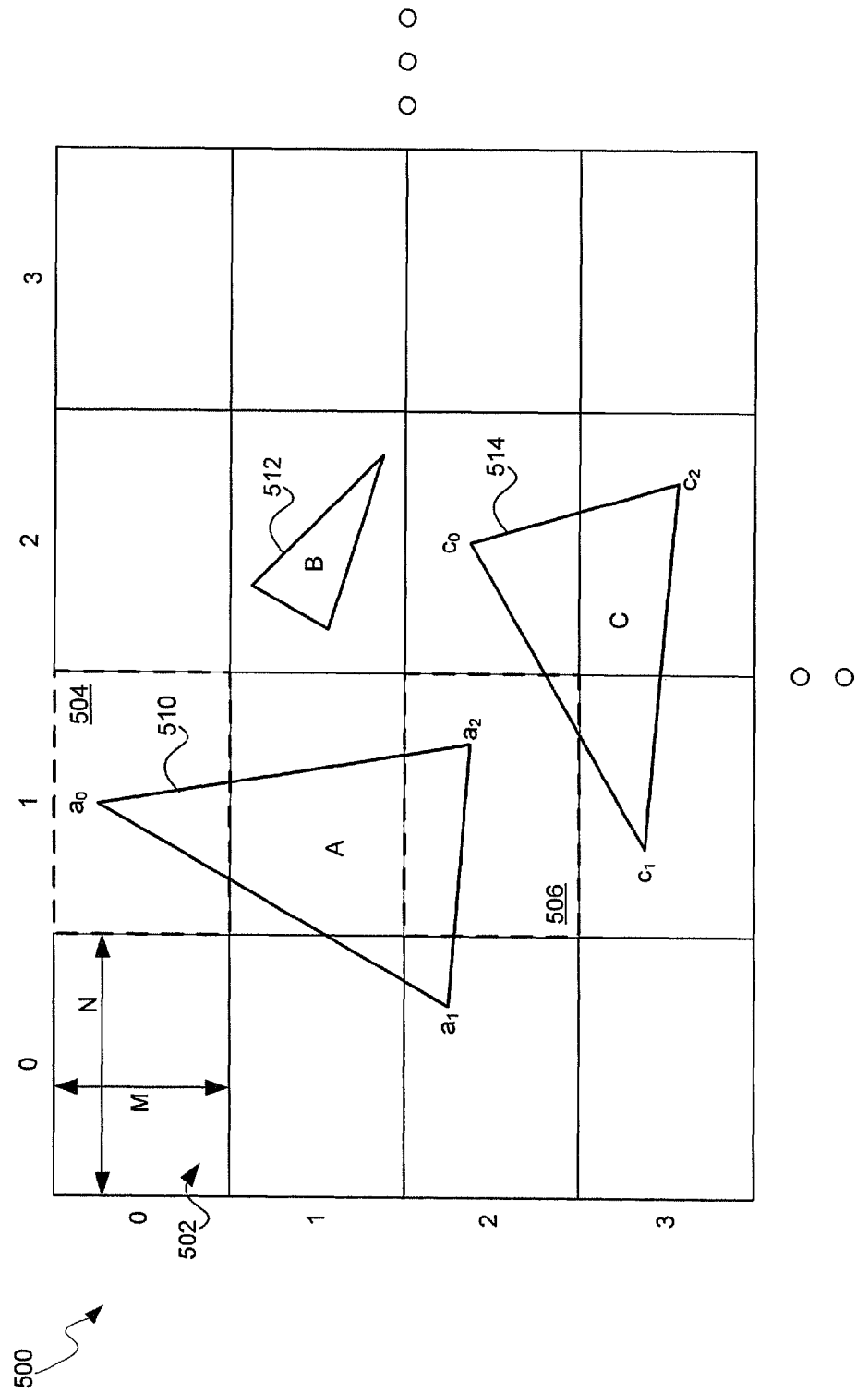
FIG. 5A is a diagram that illustrates exemplary graphics primitives transformed into a tiled view-space, in accordance with an embodiment of the invention.

FIG. 5A is a diagram that illustrates exemplary graphics primitives transformed into a tiled view-space, in accordance with an embodiment of the invention. Referring to FIG. 5A, there is shown, a tiled screen plane 500, a plurality of tiles, and a plurality of triangles that fall within tiled screen plane 500. The plurality of tiles may comprise a tile 502, a tile 504, and a tile 506. The plurality of triangles may comprise a triangle 510 (triangle A), a triangle 512 (triangle B), and a triangle 514 (triangle C). In this example, triangles are being used as illustrative primitives but the invention need not be so limited.

The tiled screen plane 500 may be divided into a plurality of tiles. The tiles may be identified according to their position. For example, the tile 504 may be identified as tile (1, 0) and the tile 506 may be identified as the tile (1, 2). In an exemplary embodiment of the invention, each of the plurality of tiles may comprise a 32×32 block of pixel information, although the invention need not be limited in this regard. For example, tile 502 is shown as comprising N pixels horizontally and M pixels vertically. In the above described example, M=N=32 pixels. In other embodiments of the invention, however, M may be different from N, and the number of pixels in each tile may depend on the number of tiles and the resolution of the tiled screen plane 500.

Graphics or geometric primitives may be positioned within the tiled screen plane 500 as a result of the transformation operations performed on the modeling coordinates. For example, the triangles A, B, and C may be placed within the tiled screen plane 500. Other types of primitives may be utilized, for example, lines, points, and/or other polygons. The graphics primitives, for example, the triangles A, B, and C, may overlap one or more of the tiles in the tiled screen plane 500. The graphics primitives may be represented according to the coordinates (i.e., position) of their vertices in the tiled screen plane 500. The graphics primitives and/or their vertices may define one or more of an image, an object and/or a surface, for example. In this regard, the coordinates may indicate a rendered object's position on the screen.

In operation, graphics primitives, for example, the triangles A, B, and C, may be positioned in the tiled screen plane 500 during the binning phase of the tile mode rendering operation and/or during the rendering phase of the tile mode rendering operation. Prior to their representation on the tiled screen plane 500, the graphics primitives, for example, the triangles A, B, and C, may be generated and/or represented in a modeling space by graphics software based on modeling space coordinates. For example, software based on OpenGL and/or variations and/or extensions thereof such as OpenGL-ES may generate the graphics primitives in modeling space. A table of vertices generated by the OpenGL software may comprise the vertex information and/or vertex attributes of the primitives. The OpenGL table of vertices may be stored in main memory. In addition, a list of indices that reference vertices stored within the OpenGL generated table of vertices may also be stored in main memory, for example, within the mobile multimedia system 105. In this regard, an index value that may be utilized to reference a particular vertex may comprise 32 bits, for example. The modeling space primitives may be arbitrarily positioned within the modeling space. The 3D pipeline 300 may read vertex information for the graphics primitives represented in the modeling space and may apply various transforms that may place the primitives, for example, the triangles A, B, and/or C at certain coordinates within the tiled screen plane 500. Coordinates for vertices of the graphics primitives in the tiled screen plane 500 may be determined by the 3D pipeline 300. For example, one or more QPUs in one or more slices may be utilized to determine the coordinates for the triangles A, B, and/or C within the tiled screen plane 500. The transformations may be implemented by matrix multiplication of modeling space coordinates and position and view information received from the OpenGL graphics software, for example.

FIG. 5B is a diagram that illustrates an exemplary table of vertex indices utilized during a binning phase in a tile mode renderer and/or a rendering phase in a tile mode renderer, in accordance with an embodiment of the invention. Referring to FIG. 5B, there is shown, a table of vertices 520 and a plurality of indexed vertex records 522, 524, 526, 528, 530, and 532. The indexed vertex records shown in FIG. 5B are for illustration purposes and the table of vertices 520 may comprise more or fewer indexed vertex records.

The table of vertices 520 may comprise vertex information for the triangles A, B, and C described above with respect to FIG. 5A. The indexed vertex records in the table of vertices 520 may comprise information utilized for coordinate shading and/or for full vertex shading of the triangles A, B, and/or C. The vertex information may also be utilized for interpolating vertices, for example, vertices interpolated for a clipped primitive as described below with respect to FIGS. 6A-6C.

In an embodiment of the invention, the indexed vertex records 522, 524, and 526 may be associated with the indices 9, 12, and 20, respectively, and each of those indexed vertex records may comprise information regarding a vertex of the triangle A. For example, the index vertex record 522 may be associated with index 9, which in turn is associated with information of vertex $a_2$ of triangle A. Similarly, the index records 524 and 526 may be associated with indices 12 and 20 and with information of vertices $a_0$ and $a_1$ of triangle A, respectively. Moreover, the indexed vertex records 528, 530, and 532 may be associated with indices 27, 30, and 41 and with information of vertices $c_1$, $c_0$, and $c_2$ of triangle C, respectively.

Some or all of the indices in the table of vertices 520 may be encoded and/or compressed during the binning phase of tile mode rendering and may be utilized to retrieve vertex information during the rendering phase of tile mode rendering. The vertex information may be referred to as vertex attributes. Information stored within each of the indexed vertex records 522, 524, 526, 528, 530, and 532 may comprise modeling space coordinates for a vertex and/or information that may enable transformation of the vertex to a location and/or a field of view, for example, within the tiled screen plane 500. Moreover, information or attributes stored within the indexed vertex records 522, 524, 526, 528, 530, and 532 may comprise lighting, texture, color and/or other information that may be utilized for full vertex shading.

The table of vertices 520 may be stored in main memory and the indexed vertex information needed for rendering of a particular tile may be read into local memory based on the compressed tile list during full vertex shading of the tile. Once the pixels for that particular tile are rendered, the pixel data may be stored in main memory.

In operation, rendering of the triangles A, B, and/or C may comprise a first or binning phase and a second or rendering phase. The triangles A, B, and/or C may be rendered based on information describing their vertices and/or any interpolated vertices. In this regard, steps performed during the binning phase may comprise a subset of the steps performed during the rendering phase. For example, during the binning phase, primitives may be transformed into the 2D image space associated with the screen plane and 2D image space coordinates for the vertices of the primitives may be determined. As such, the binning phase may utilize a coordinate shader or perform a coordinate shading operation. During this phase, primitives that overlap a tile may be identified. For example, the tile 504 in FIG. 5A (shown in dashed lines), which has tile coordinates (1, 0), may be overlapped by triangle A. The tile 506 in FIG. 5A (also shown in dashed lines), which has tile coordinates (1, 2), may be overlapped by both triangle A and triangle C. Vertex information and/or vertex attributes for the vertices of triangles A and C may be stored in indexed records within the table of vertices 520. For each tile in the tiled screen plane 500 in FIG. 5A, a tile list may be generated during the binning phase that may comprise indices that may be utilized to index vertices within the table of vertices 520. For example, a tile list for the tile 504 having coordinates (1, 0) may comprise indices that point directly and/or indirectly to records for the vertices of triangle A, that is, the primitive that overlaps tile 504. Similarly, a tile list for the tile 506 having coordinates (1, 2) may comprise indices that point directly and/or indirectly to records for the vertices of triangles A and C, that is, the primitives that overlap tile 506. The indices comprised within the list or lists generated during the binning phase may be compressed, for example. In some instances, the plurality of lists produced during the binning phased may be referred to as a single list.

FIG. 5C is a diagram that illustrates exemplary lists generated during a binning phase in a tile mode renderer, in accordance with an embodiment of the invention. Referring to the FIG. 5C, there is shown a tile list 550 comprising tile records 552 and 554. The tile records shown in FIG. 5C are for illustration purposes and the tile list 550 may comprise more or fewer tile records. Moreover, each tile record may also be referred to as a list or tile list.

The tile list 550 may be generated during the binning phase of a tile mode rendering operation based on determined vertex coordinates of the triangles A, B, and/or C in the tiled screen plane 500. For example, the VCM and VCD 304 (see FIG. 3) may collect vertex attributes and place them into memory such as the VPM 316. A tile binner, such as the PTB 306, for example, may fetch transformed vertex coordinates and/or primitives from the VPM 316 and may generate the tile list 550 that may comprise indices.

Each tile from the plurality of tiles in the tiled screen plane 500 may be associated with a record or list in the tile list 550. For example, the tile record 552 may be associated with tile 504 having coordinates (1, 0) and the tile record 554 may be associated with the tile 506 having coordinates (1, 2). In an embodiment of the invention, the record 552 may comprise information of the tile 504 and/or of the triangle A. In addition, the record 432 may comprise one or more indices that may point directly or indirectly to one or more records comprising vertex information for the triangle A. In the example shown in FIG. 5C, the indices 12, 20, and 9, which are associated with the vertices of triangle A in the table of vertices 520, are also associated with the tile record 552. The indices 12, 20, and 9 may be compressed. Similarly, the record 554 may comprise information of the tile 506 and/or information of the triangles A and C. In addition, the tile record 554 may comprise one or more indices that may point to one or more records in the table of vertices 520, which comprises vertex information for the triangles A and C. For triangle A, for example, the tile record 554 may comprise indices 12, 20, and 9, while for triangle C, for example, the tile record 554 may comprise indices 30, 27, and 41.

In operation, information in the tile list 550 may be utilized for controlling tile mode rendering by the 3D pipeline 300. For example, vertices may be rendered on a tile-by-tile basis based on contents in the tile lists. In this regard, during the binning phase, compressed indices corresponding to records of the table of vertices 520 may be stored in the tile list 550. Also, other information within the tile list 550 may be compressed. For example, the compressed indices stored in the tile list 550 may be differentially encoded by indicating a difference in adjacent or nearby index values rather than storing absolute index values. Absolute index values may comprise a large number of bits, for example, 32 bits, and differential encoding of the indices may significantly reduce memory bandwidth for storing tile lists as well as improving cache access time. Moreover, in instances when one or more of the vertices are shared by a plurality of joined primitives, for example, two triangles may share two vertices. In such instances, shared indices need not be repeated in a tile list. Once an index is listed for one vertex and/or for one primitive, indices listed for another joined primitive may comprise the indices of those vertices that have not been previously encoded in the tile list. Additional information regarding how the primitives are joined may also be encoded in the tile list. For example, triangles may be joined in a fan or strip pattern. Furthermore, a sequence of fans and/or strips may be joined. In various embodiments of the invention, a compressed sequence of indices may be represented in the tile list 550 by one number. An example of joined primitives is shown below with respect to FIG. 6B. In contrast, OpenGL software output may comprise a 32 bit index for each vertex in each joined primitive.

In various embodiments of the invention, the coordinates that result from the transformation operations, such as modeling transformation, camera transformation, and projection, for example, and that are determined during the binning phase of the tile mode rendering operation may be discarded or deleted once the tile lists are generated. The transformation operations may be performed again during the rendering phase of the tile mode rendering operation. In this manner, memory may be conserved.

Indices generated by OpenGL software may be represented by 32 bit numbers. Accordingly, three vertices of a triangle may be indexed by OpenGL software with three uncompressed 32 bit numbers. The vertex indices may be compressed and/or encoded.

Figure 6A:
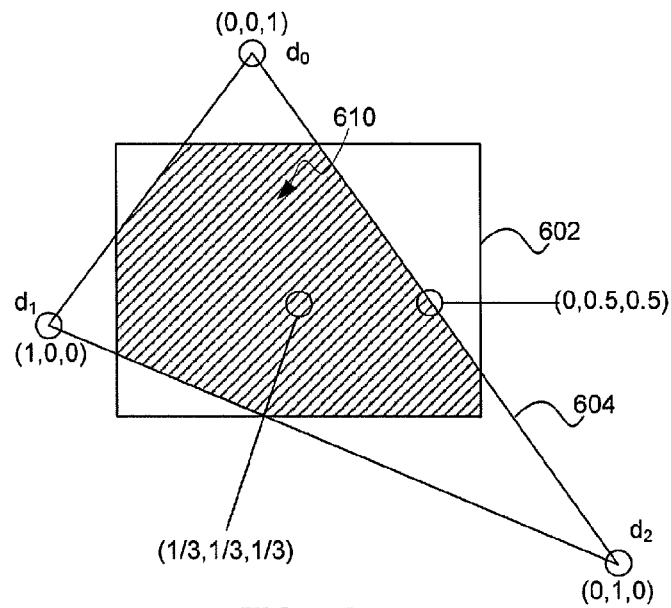
FIGS. 6A and 6B are each a diagram that illustrates an example of graphics primitive clipping in a tile mode renderer, in accordance with an embodiment of the invention.
Figure 6B:
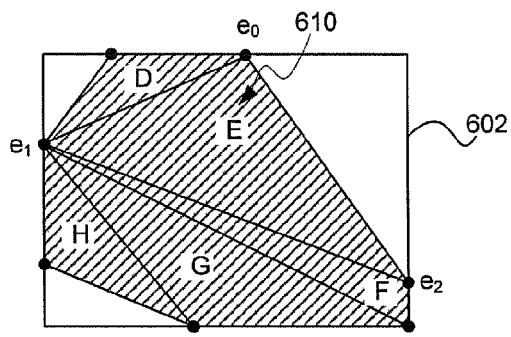

FIGS. 6A and 6B are each a diagram that illustrates an example of graphics primitive clipping in a tile mode renderer, in accordance with an embodiment of the invention. Referring to FIG. 6A, there is shown a screen plane 602, a triangle 604, and a portion 610 of the triangle 604 that overlaps the screen plane 602. The screen plane 602 may be a tiled screen plane such as the tiled screen plane 500, for example. In FIG. 6A, the triangle 604 is being used for illustration purposes and a similar approach as described below may be utilized for other types of primitives, such as polygons, for example. Moreover, clipping may be utilized for those primitives in which a substantial portion lies outside the screen plane 602. A 3D pipeline, such as the 3D pipeline 218 and the 3D pipeline 300, may be utilized to determine which primitive is to be clipped based on the area of the primitive that lies outside the viewing window. Other approaches may be utilized for those primitives that have an insubstantial portion outside the viewing window or screen plane.

Also shown in FIG. 6A are the barycentric coordinates of the triangle 604. For example, the barycentric coordinates for vertex $d_0$ are (0, 0, 1), for vertex $d_1$ are (1, 0, 0), and for vertex $d_2$ are (0, 1, 0). The barycentric coordinates may be determined for any point or location in the triangle 604 based on the coordinates at the vertices. For example, a middle point along the triangle edge between vertices $d_0$ and $d_2$ has barycentric coordinates (0, 0.5, 0.5). Moreover, a geometric center (i.e., centroid) of the triangle 604 has barycentric coordinates (⅓, ⅓, ⅓). Typically, the values of the barycentric coordinates add up to 1.

In operation, during a binning phase of the tile mode rendering, the coordinates of the vertices of the triangle 604 may be determined. In addition, it may be determined that portions of the triangle 604 may extend beyond the area of the screen plane 602. In this instance, the portions of the triangle 604 that extend beyond the border of the screen plane 602 may be clipped or truncated to produce a clipped portion 610. New vertices associated with the clipped portion 610 may be determined.

Referring to FIG. 6B, there is shown the screen plane 602 and the clipped portion 610 divided into a plurality of new triangles or clipped primitives that may be stored in a record. While the clipped portion 610 is shown as having multiple triangles, other primitive types, such as polygons, for example, may also be used. The new triangles D, E, F, G, and H that comprise the clipped portion 610 may be joined and arranged in a fan-like pattern as illustrated in FIG. 6B. For example, the new triangles may comprise shared vertices, some or all of which may be new or clipped vertices. In the example illustrated in FIG. 6B, the new triangles may all have a common new vertex $e_1$.

Rather than binning the triangle 604, the new triangles D, E, F, G, and H may be used during the binning phase of the tile mode rendering operation. For example, it may be determined which tiles are overlapped by the new triangles. Tile lists may be populated with information regarding the new triangles. For example, vertex coordinates for the new triangles may be directly stored within relevant tile lists along with barycentric coordinates for each new vertex. The barycentric coordinates for a new vertex may be utilized to determine shading properties for the vertices of the new triangles during the rendering phase of the tile mode rendering operation. For example, the barycentric coordinates of the vertices of the new triangles may be utilized as weights for interpolation operations during the rendering phase. That is, the barycentric coordinates may be used during the rendering phase of the tile mode rendering operation to set up the varyings of the clipped or new vertices from the varyings calculated by a vertex shader from the original vertices of the triangle 604.

In operation, the clipped portion 610 of the triangle 604 may be divided into a plurality of new primitives. The new primitives may also be referred to as clipped primitives, for example. Because the clipped portion 610 is likely to be a complex polygon, the clipped portion 610 can be divided into a plurality of triangles. The coordinates for the vertices of these new triangles may be determined from the coordinates of the vertices of the triangle 604, for example. The barycentric coordinates and/or weights for the vertices of the new triangles may be determined from the barycentric coordinates and/or weights of the vertices of the triangle 604, for example. The coordinates of the new vertices as well as the barycentric coordinates and/or weights may be stored in the appropriate tile lists. Because the barycentric coordinates and/or weights add up to, only two of the three coordinates may need to be stored. Moreover, a vertex that is shared by more than one of the new triangles may be stored once rather than multiple times corresponding to the number of new triangles that share that vertex.

In various embodiments of the invention, memory may be conserved by storing clipped primitive information in a separate memory location and pointing to it from the tile list. This may conserve significant memory bandwidth in instances when the clipped primitive overlaps a plurality of tiles.

Figure 6C:
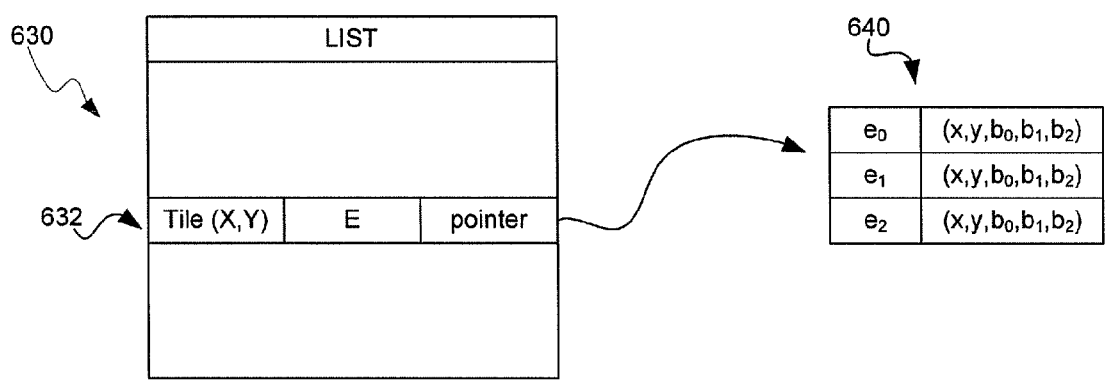
FIG. 6C is a diagram that illustrates an exemplary list generated during a binning phase in a tile mode renderer comprising information associated with clipped graphics primitives, in accordance with an embodiment of the invention.

FIG. 6C is a diagram that illustrates an exemplary list generated during a binning phase in a tile mode renderer comprising information associated with clipped graphics primitives, in accordance with an embodiment of the invention. Referring to FIG. 6C, there is shown a tile list 630 comprising a tile record 632. The tile record 632 may be associated with a tile having coordinates (X,Y) in the screen plane shown in FIGS. 6A and 6B. The tile record 632 may indicate that the new triangle E that resulted from the clipping or truncation of the triangle 604 may overlap the tile (X,Y). The tile record 632 may comprise a pointer that points to another record 640. The record 640 may comprise information associated with the vertices $e_0$, $e_1$, and $e_2$ of the new triangle E. For example, for each vertex of the new triangle E, the record 640 may comprise vertex coordinate information and may also comprise barycentric coordinates and/or weights information.

In operation, during the binning phase of the tile mode rendering operation, when building tile lists, those tiles that are overlapped by primitives that result from the clipping or truncation of other primitive may comprise a pointer or other like structure. The pointer may point or associate the tile list with another record comprising coordinate information and/or barycentric coordinate information. During the rendering phase of the tile mode rendering operation, the tile lists built during the binning phase may be utilized with a vertex shader to provide full vertex shading. In this regard, the tile lists may point to one or more additional records comprising information related to clipped primitives that may also be used to perform full vertex shading.

Figure 7:
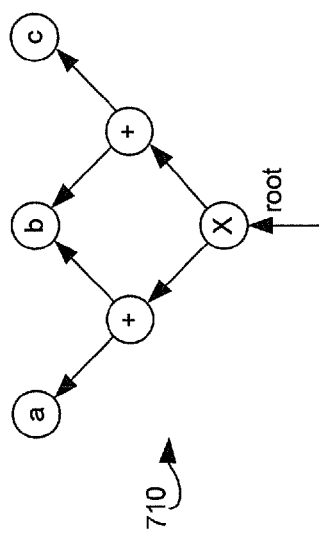
FIGS. 7 and 8 are each a diagram that illustrates data flow graphs to generate a coordinate shader for use in a tile mode renderer, in accordance with an embodiment of the invention.
Figure 8:
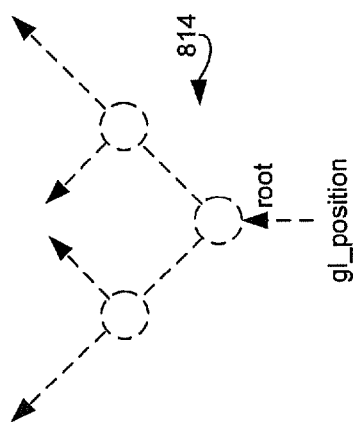
Figure 8:
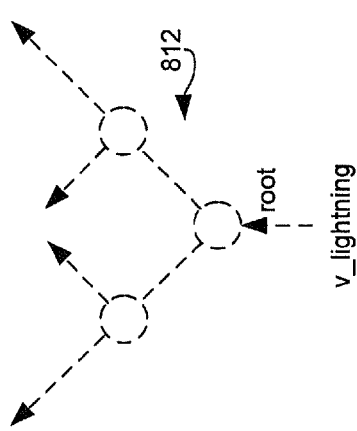
Figure 8:
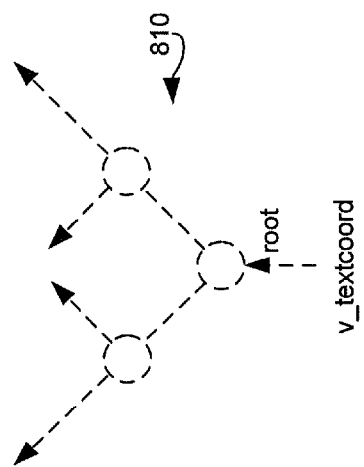

FIGS. 7 and 8 are each a diagram that illustrates data flow graphs to generate a coordinate shader for use in a tile mode renderer, in accordance with an embodiment of the invention. Regarding FIG. 7, there is shown a data dependence or data flow graph 710 that represents the operation $(a+b)*(b+c)$. The data flow graph 710 may comprise a root node from which the operation may be pulled during compilation. A data flow graph representation of an operation or of multiple operations may be suitable for the type of architecture embodiments described above with respect to the video processing core 200, the 3D pipeline 218, and/or the 3D pipeline 300, for example. In some embodiments, the source code from which the coordinate shader and/or the vertex shader may be compiled may be represented as whole-program data flow graphs.

Regarding FIG. 8, there is shown a graphical representation of a vertex shader source code. The vertex shader source code may comprise a whole-program data flow graph representation with a data flow graph 810 associated with texture operations (v_textcoord), a data flow graph 812 (v_lighting) associated with lighting operations, and a data flow graph 814 (gL_position) associated with positional operations such as transformations and/or projections, for example. Each of the data flow graphs 810, 812, and 814 may comprise a root node from which the respective operations may be pulled during compilation. The vertex shader may be obtained by compiling the vertex shader source code. Moreover, the coordinate shader may be obtained from the vertex shader source code at compile time by slicing the portion of the vertex shader source code associated with the operations of the coordinate shader. In some instances, the coordinate shader may be obtained automatically from the vertex shader at compile time.

Figure 9:
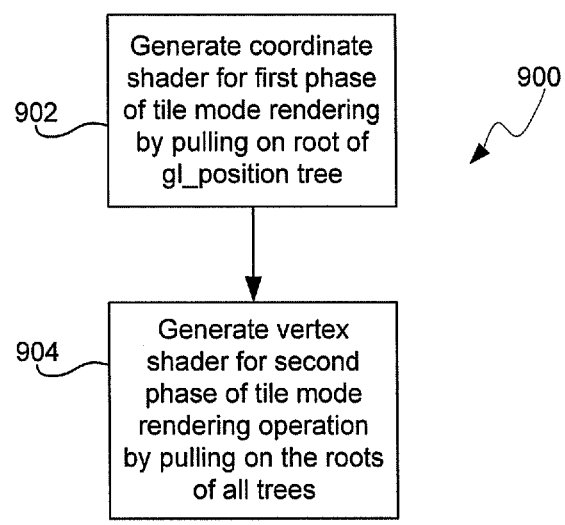
FIG. 9 is a flow chart that illustrates an exemplary generation of a coordinate shader and a vertex shader from a data dependence graph representation of a vertex shader source code, in accordance with an embodiment of the invention.

FIG. 9 is a flow chart that illustrates an exemplary generation of a coordinate shader and a vertex shader from a data dependence graph representation of a vertex shader source code, in accordance with an embodiment of the invention. Referring to FIG. 9, there is shown a flow graph 900. At step 902, a coordinate shader to be utilized during a binning phase of a tile mode render may be generated by, for example, pulling at compile time on the root node of the data flow graph 814 (gL_position) of the whole-program data flow graph representation of a vertex shader source code shown in FIG. 8. As described above, the data flow graph 814 may be data dependence representation of the positional operations provided by the vertex shader. By pulling on the root node of the data flow graph 814, the machine code or assembler for the coordinate shader may be generated. In this regard, the coordinate shader machine code or assembler may be suitable for execution in a 3D pipeline such as the 3D pipeline 218 and the 3D pipeline 300 described above with respect to FIGS. 2 and 3, respectively.

At step 904, a vertex shader to be utilized during a rendering phase of a tile mode render may be generated by, for example, pulling on all the root nodes of the data dependence representation of the vertex shader source code at compile time. For example, at compile time, the root node of the data flow graph 814 (gL_position), the root node of the data flow graph 810 (v_textcoord), and the root node of the data flow graph 812 (v_lighting), may be pulled together to generate the vertex shader machine code or assembler. In this regard, the vertex shader machine code or assembler may be suitable for execution in a 3D pipeline such as the 3D pipeline 218 and the 3D pipeline 300 described above with respect to FIGS. 2 and 3, respectively.

In some embodiments of the invention, the coordinate shader and/or the vertex shader may be compiled to be programmed into processors such as digital signal processors (DSPs), for example, and/or programmable hardware devices, for example. In other embodiments of the invention, the coordinate shader and/or the vertex shader may be compiled from source code described using a hardware-based programming language such that the compilation may be utilized to generate or configure an integrated circuit such as an application specific integrated circuit (ASIC) and/or a programmable device such as a field programmable gate array (FPGA), for example.

In an embodiment of the invention, a system for graphics processing, such as the video processing core 200 described above with respect to FIG. 2, may comprise one or more processors operable to generate position information for a plurality of primitives, such as triangles A, B, and C in FIG. 5A, for example, utilizing a coordinate shader. Coordinate shading may be performed at least in part in, for example, one or more of the QPUs disclosed above with respect to FIG. 3. The one or more processors may comprise, for example, the 3D pipeline 218 also above described with respect to FIG. 2. The one or more processors may be operable to generate one or more lists, such as the table of vertices 520 in FIG. 5B and/or the tile lists 550 and 630 in FIGS. 5C and 6C, for example, based on the generated position information. The one or more lists may comprise indices associated with one or more primitives from the plurality of primitives and with one or more tiles from a plurality of tiles in a screen plane. An example of a screen plane is the tile screen plane 500 in FIG. 5A. The one or more processors may be operable to generate rendering information for the plurality of primitives utilizing a vertex shader and the generated one or more lists.

The one or more processors may be operable to generate the position information and the one or more lists during a first rendering phase, and to generate the rendering information during a second rendering phase different from the first rendering phase as illustrated in, for example, the flow chart 400 in FIG. 4. The one or more processors may be operable to delete the position information after the generated one or more lists are completed. The one or more processors may be operable to utilize the coordinate shader to transform modeling coordinates from a model space to a viewing space and/or to project the transformed modeling coordinates onto the screen plane, such as the tile screen plane 500, for example.

The one or more processors may be operable to utilize the vertex shader to transform modeling coordinates from a model space to a viewing space, project the transformed modeling coordinates onto the screen plane, such as the tile screen plane 500, for example, and determine one or both of lightning information and texture information from the transformed modeling coordinates. The one or more processors may be operable to utilize the coordinate shader to perform a subset of the operations supported by said vertex shader. The one or more processors comprise and/or execute one or both of the coordinate shader and the vertex shader. Moreover, the one or more processors may be operable to clip a primitive from the plurality of primitives that lies outside the screen plane to produce one or more clipped primitives that lie within the screen plane, associate each of the one or more clipped primitives with one or more tiles from the plurality of tiles in the screen plane, and add one or more pointers to the one or more lists. Each of the one or more pointers indicating a record corresponding to one of the associated clipped primitives, where such record can comprise barycentric coordinates of the associated clipped primitive. An example of clipped primitives can be the new triangles D, E, F, G, and H illustrated with respect to FIG. 6B.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a tile mode renderer with coordinate shader.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for graphics processing, comprising:
performing by one or more processors and/or circuits in a video processor:
generating position information for a plurality of primitives utilizing a coordinate shader;
generating one or more lists based on said generated position information, said one or more lists comprising indices associated with one or more primitives from said plurality of primitives and with one or more tiles from a plurality of tiles in a screen plane; and
generating rendering information for said plurality of primitives utilizing a vertex shader and said generated one or more lists, wherein the coordinate shader is generated from the vertex shader by compiling a vertex shader source code corresponding to texture operation data, lighting operation data, and positional operation data from the one or more lists.

2. The method according to claim 1, comprising:
generating said position information and said one or more lists during a first rendering phase; and
generating said rendering information during a second rendering phase different from said first rendering phase.

3. The method according to claim 1, comprising deleting said position information after said generated one or more lists are completed.

4. The method according to claim 1, comprising transforming modeling coordinates from a model space to a viewing space utilizing said coordinate shader.

5. The method according to claim 4, comprising projecting said transformed modeling coordinates onto said screen plane utilizing said coordinate shader.

6. The method according to claim 1, comprising transforming modeling coordinates from a model space to a viewing space utilizing said vertex shader.

7. The method according to claim 6, comprising projecting said transformed modeling coordinates onto said screen plane utilizing said vertex shader.

8. The method according to claim 7, comprising determining, by said vertex shader, one or both of lightning information and texture information from said transformed modeling coordinates.

9. The method according to claim 1, comprising performing, by said coordinate shader, a subset of the operations supported by said vertex shader.

10. The method according to claim 1, comprising:
clipping a primitive from said plurality of primitives that lies outside said screen plane to produce one or more clipped primitives that lie within said screen plane;
associating each of said one or more clipped primitives with one or more tiles from said plurality of tiles in said screen plane; and
adding one or more pointers to said one or more lists, each of said one or more pointers indicating a record corresponding to one of said associated clipped primitives, said record comprising barycentric coordinates of said associated clipped primitive.

11. The method according to claim 1, wherein the coordinate shader is generated from the vertex shader at compile time by slicing a portion of a vertex shader source code associated with operations of the coordinate shader.

12. The method according to claim 1, wherein the coordinate shader is generated from the vertex shader automatically during vertex shader operation.

13. The method according to claim 1, wherein compiling the data dependence of the texture operations, comprises accessing a root node for compiling the texture operations.

14. The method according to claim 13, wherein the root node comprises an initial operation corresponding to the data dependence for compiling the texture operations.

15. The method according to claim 1, wherein compiling the data dependence of the lighting operations, comprises accessing a root node for compiling the lighting operations.

16. A system for graphics processing, comprising:
one or more processors operable to generate position information for a plurality of primitives utilizing a coordinate shader;
said one or more processors being operable to generate one or more lists based on said generated position information, said one or more lists comprising indices associated with one or more primitives from said plurality of primitives, the one or more lists corresponding to one or more tiles from a plurality of tiles in a screen plane, and the one or more lists describing a data dependence of the generated positional information;
said one or more processors being operable to generate rendering information corresponding to a coordinate shader for said plurality of primitives utilizing the vertex shader and said generated one or more lists; and
said one or more processors being operable to transform a source code of the vertex shader to generate the coordinate shader.

17. The system according to claim 16, wherein said one or more processors are operable to:
generate said position information and said one or more lists during a first rendering phase; and
generate said rendering information during a second rendering phase different from said first rendering phase.

18. The system according to claim 16, wherein said one or more processors are operable to delete said position information after said generated one or more lists are completed.

19. The system according to claim 16, wherein said one or more processors are operable to utilize said coordinate shader to transform modeling coordinates from a model space to a viewing space.

20. The system according to claim 19, wherein said one or more processors are operable to utilize said coordinate shader to project said transformed modeling coordinates onto said screen plane.

21. The system according to claim 16, wherein said one or more processors are operable to utilize said vertex shader to:
transform modeling coordinates from a model space to a viewing space;
project said transformed modeling coordinates onto said screen plane; and
determine one or both of lightning information and texture information from said transformed modeling coordinates.

22. The system according to claim 16, wherein said one or more processors comprise both of said coordinate shader and said vertex shader.

23. The system according to claim 16, wherein said one or more processors are operable to execute both of said coordinate shader and said vertex shader.

24. The system according to claim 16, wherein said one or more processors are operable to:
clip a primitive from said plurality of primitives that lies outside said screen plane to produce one or more clipped primitives that lie within said screen plane;
associate each of said one or more clipped primitives with one or more tiles from said plurality of tiles in said screen plane; and
add one or more pointers to said one or more lists, each of said one or more pointers indicating a record corresponding to one of said associated clipped primitives, said record comprising barycentric coordinates of said associated clipped primitive.

25. The method according to claim 16, wherein the positional information defines transformation information operable to transform modeling coordinates from a model space to a view space.

26. The method according to claim 25, wherein the positional information defines projection information to project the transformed modeling coordinates from the view space onto a screen plane.

* * * * *